United States Patent [19]

Karaev et al.

[11] Patent Number: 5,088,638
[45] Date of Patent: Feb. 18, 1992

[54] METHOD FOR MAKING SUCKER RODS

[76] Inventors: Islam K. O. Karaev, 3-y mikroraion ulitsa Pishevari, IO, kv. II5.; Talat M. O. Shikhlinsky, ulitsa Nizami, 103, kv. 3I., both of Baku; Konstantin P. Polikhronov, Permskaya oblast, ulitsa Oktyabrskaya, I8, kv .IO., Ocher; Pavel M. Sutovsky, ulitsa Tolstogo, 193, kv. 56., Baku; Emilia V. Avakian, ulitsa U. Gadzhibekova, 45, blok II, kv. IO4., Baku; Nikolai V. Semkin, ulitsa S. Nametkina, I3a, kv. I7., Baku; Avraam M. Rabinovich, ulitsa Shikhali Kurbanova, 2/I5, kv. I7I., Baku; Rauf D. Dzhabarov, Juzhno-Sovetskaya ploschad, 3I/33, kv. I3., Baku, all of U.S.S.R.

[21] Appl. No.: 349,108

[22] Filed: May 9, 1989

Related U.S. Application Data

[63] Continuation of Ser. No. 99,296, filed as PCT/SU85/00093, Nov. 26, 1985, abandoned.

[51] Int. Cl.⁵ ............................................. B23K 20/12
[52] U.S. Cl. ...................................... 228/112; 228/114; 228/173.5
[58] Field of Search ............................. 228/112–116, 228/160, 173.5, 2, 3.1

[56] References Cited

U.S. PATENT DOCUMENTS 3,295,613 1/1967 Anderson ............................. 228/112
4,487,357 12/1984 Simon .................................. 228/114

FOREIGN PATENT DOCUMENTS 978996 12/1982 U.S.S.R. .
2104936 3/1983 United Kingdom ................. 228/112

OTHER PUBLICATIONS

Metals Handbook, Ninth Edition, vol. 6, Friction Welding, 1983.
D. N. Reshetov, "Detali Mashin", 1974, Mashinostroenie publishers (Moscow) cf. pp. 416, 417, 424.

Primary Examiner—Nicholas P. Godici
Assistant Examiner—Samuel M. Heinrich
Attorney, Agent, or Firm—Lilling & Greenspan

[57] ABSTRACT

A method for making sucker rods composed of a rod body (1) and end heads (2), consisting in upsetting the rod body end portions (8) carried out at a temperature that precludes softening of the rod body (1) metal, a thickening (9) being formed on each of the end portions (8), the width of the thickening in a direction perpendicular with the rod body (1) axis being equal to or in excess of the head (2) maximum diameter in the weld joint place, while its length exceeds the width of the heat-affected area (17) involved in the welding process. A transition portion (10) shaped as a solid of revolution has a cross-section which smoothly and continuously decreases from the thickening (9) towards the rod body (1). The upsetting procedure is followed by friction welding of each of the end heads (2) together with the thickening (9) on the rod body and portion (8) and by turning the weld joint zone.

4 Claims, 2 Drawing Sheets

METHOD FOR MAKING SUCKER RODS

This is a continuation, division of Application Ser. No. 07/099,296 filed as PCT/SU85/00093, Nov. 26, 1985, and now abandoned.

BACKGROUND OF THE INVENTION

1. Field of the Invention

The present invention relates to sucker rods and has particular reference to a method for making sucker rods.

2. Description of the Prior Art

Thread-interconnected sucker rods serve for transmitting reciprocating motion from the pumping unit situated at the wellhead, to the oil-well sucker-rod pump located on the bottom section of the sucker rod string along which oil is extracted from the producer well.

Sucker rods that have up till now been made solid in compliance with Standard APJ Spec 11B, are in fact long-length cylinder-shaped bodies provided with threaded heads at their ends.

The head-to-body transition assumes a long-sweep curve, while the generant of the transition is in effect a circular arc tangent to the body generant and having its center located off the rod. Such a form of the head-to-body transition is required for reducing stress concentration effective in the transition zone both during the rod operation and for holding the weight of a suspended rod string during the round-trip operation with the aid of a special device, i.e., elevator having a surface on which a contact with the rod transition portion occurs, said surface being shaped so as to suit the shape of such transition portion. It is due to such a form of the head-to-body transition that the rod surface in contact with the elevator is protected against local mutilation and premature wear which might subsequently prove to be a regent of corrosion-fatigue cracks and eventually a complete failure.

When in operation sucker rods undergo a complex cyclic loading while imparting reciprocating motion to the pump plunger and are attacked by corrosive fluids contained in the oil extracted and are subjected to bending when operating in directionally slant drilled or inclined wells. Threaded joints of the sucker rods are also subject to wear during their making-and-braking.

Such a complex cluster of effects act on the sucker rods that they are exposed to high stresses causative of failures in the threaded joints and within the zone of the body-to-head transition.

It is due to the fact that, when in operation, sucker rods are positioned one above another and have to operate continuously within a prolonged period of time, that especially strict requirements are imposed upon their operating reliability. High reliability of sucker rods is the more so necessary as failure of one of the rods results in damage to all other rods of the string, which involves shutdown of the well and expensive repair work.

Thus, reliable operation of sucker rods is the principal criterion of their construction.

Taking account of mass production of sucker rods and the considerable expenses for their manufacture, and, high consumption of expensive alloyed steel used for their production, there has been proposed that sucker rods be of a welded construction rather than a solid one.

Known in the art is a method for making sucker rods composed of a rod body and end heads (cf. British Patent No. 2,104,936A, Cl. E 21 B 17/00 published on Mar. 16, 1983) which consists in their pressure-welding, followed by turning of the weld joint zone with formation of heat-affected areas both in the rod body and end heads.

When carrying said method into effect use is made of the heads whose configuration corresponds to that of solid sucker-rod heads as per Standard APJ Spec 11B. Pressure welding, in particular, friction welding is carried out on surfaces having equal cross-sectional area which is equivalent to that of the rod.

Such a method for making sucker rods cannot assure their operating reliability for a number of reasons.

The welded joint is established across the minimum rod cross-section and is located at the least favorable rod portion, that is, at the place of the body-to-head transition, where considerable effect is exerted by the constructional stress concentrator associated with the rod cross-section variation.

Inevitable inaccuracy of head-to-body welding, which is due to imperfect positioning of components to be weld-joined in a welding machine and dimensional errors of the blanks being welded, results in shoulders and other imperfections unavoidably left after flash elimination and affecting adversely the corrosion-fatigue strength characteristics of the sucker rods.

The initial structure of metal is modified in the heat-affected zone as a result of high-temperature heating during the welding procedure, which also tells adversely on the load-bearing capacity of a welded joint and makes it practically impossible to efficiently use prehardened rolled stock for manufacture of sucker rods. This is of special importance since heat-and especially heat-and-strain hardened rolled stock from carbon or low-alloy steels features high strength and plasticity characteristics, as well as increased fatigue limit when exposed to the effect of a corrosive medium, which renders it suitable for making welded sucker rods therefrom rather than from expensive alloyed rolled stock.

SUMMARY OF THE INVENTION

It is a principal object of the invention to provide a method for making sucker rods, comprising preconditioning of the rod body not resulting in softening of the rod body metal and rendering it possible to weld the heads across the maximum rod cross-section, which ensures high operating reliability of the rods, reduces their production costs, and enables prehardened rolled stock to be applied without heat treatment of sucker rod as a whole.

The aforesaid object is accomplished in a method for making sucker rods composed of a rod body and ends heads, consisting in their being pressure-welded resulting in formation of heat-affected areas and turning of the weld joint zone. According to the invention, the end portions of the rod body are subjected, before welding, to upsetting that prevents softening of the rod body metal, so as to form a thickening on each of the body end portions, the width of said thickening being equal to or in excess of the head maximum diameter in the weld joint place, in a direction square with the rod body axis, while the length of said thickened portion exceeds the width of the heat-affected area involved in welding, as well as a transition portion shaped as a solid of revolution having a curvilinear generant, whose cross-section smoothly and continuosly decreases from said thickened portion towards the rod body axis.

It is expedient that the generant of the solid of revolution be curvilinear and in fact a circular arc.

It is reasonable that the length of a thickened portion at either of the rod body end be selected within 0.3 to 0.4 of the maximum head diameter.

The herein-proposed method for making sucker rods provides for their high operating reliability which accounted for by the fact that a welded joint between the end heads and the rod body is established on the end surfaces or butts having the maximum area for each sucker rod, and on the rod portion where minimum stresses occur.

Simply shaped upsetting at the rod body ends along with small amount of metal involved in the upsetting operation enables one to carry out said operation at relatively low temperatures, whereby no softening of the original metal of the rod body takes place. This makes it possible to use preliminarily heat-treated metal for the rod body (including that subjected to heat refining, i.e., hardening with subsequent high-temperature tempering, or to heat-and-strain hardening) rather than heretofore-used expensive high-alloy rolled stock.

A transition portion shaped as a solid of revolution with a curvilinear generant, which is established by the upsetting operation, conforms to the transition form the rod body to the head of a solid sucker rod as specified by Standard APJ Spec 11B, which ensures reliable sucker rod operation and enables one to use the elevators commonly applied for the round-trip operations.

Thus, the proposed method for making sucker rods provides for the high operating reliability, possibility of applying prehardened rolled stock for sucker rod bodies without heat-treatment of a sucker rod as a whole, which calls forth reduced production costs thereof and enables heat-treatment equipment to be dispensed with for processing of the sucker rod as a whole.

BRIEF DESCRIPTION OF THE DRAWINGS

In what follows the invention will now be disclosed in a detailed description of a specific illustrative embodiment thereof with reference to the accompanying drawings, wherein.

DESCRIPTION OF THE PREFERRED EMBODIMENT

Figure 1:
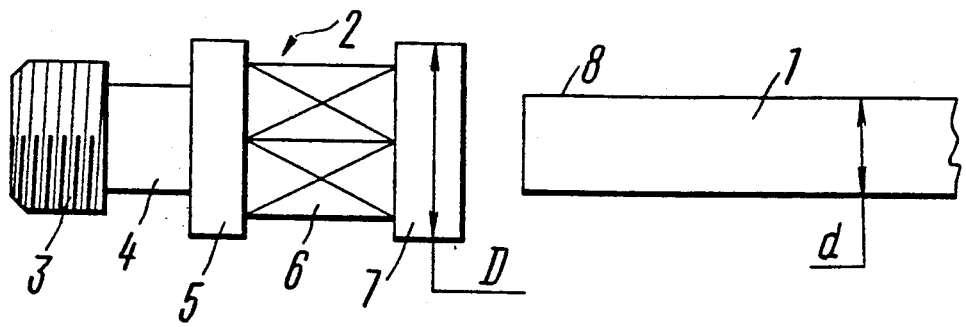
FIG. 1 is a general schematic view of an end head and a fragmentary view of the rod body before upsetting its end portion, according to the invention.

The method for making sucker rods composed of a rod body 1 having the diameter d (FIG. 1) and end heads 2, is as follows. To make a sucker rod use is made of the prefabricated rod body 1 and two heads 2 (one of these being omitted in the drawing), each of such heads consisting of a threaded section 3, a past-thread groove 4, a thrust collar 5, and a square neck 6, all these being manufactured to suit the requirements imposed by Standard APJ Spec 11B, and a welded-on collar 7 having a diameter D which is the maximum permissible for the head 2 and is equal to the diameter of the thrust collar 5. The head 2 is subjected to heat-treatment required depending on the material used, before finish machining.

The materials applied and the heat-treatment carried out may be similar or dissimilar depending on operating conditions the sucker rods being manufactured have to work under. Whenever necessary, a material having higher mechanical characteristics may be applied for making the heads 2, which enables the size of the heads 2 to be reduced, whereby the sucker rods are applicable in a smaller-diameter string which is of very high efficiency.

Before welding the rod body 1 and the heads 2 together end portions 8 of the rod body 1 are subjected to upsetting in a horizontal forging machine or press at a temperature precluding the softening of the metal the rod body 1 is made from. The temperature of heating before upsetting must be within a minimum temperature to which the metal of the rod body 1 has been heated during its preliminary heat-treatment.

For instance, when the metal of the rod body 1 has been subjected to normalizing at a temperature of 900° C. or about such, the end portion 8 can be heated before upsetting to a temperature about 750°–800° C.

Whenever the rod body 1 has been subjected to hardening followed by high-temperature tempering at approximately 650° C., the heating before upsetting must be about 600°–620° C. It is preferable that the heating of the end portions 8 be carried out within short periods of time using, e.g., radio-frequency induction heating.

Since the upsetting of the end portions 8 of the rod body 1 occurs at a temperature precluding the softening of the metal the rod body 1 is made from, the rod body 1 can be made from preliminarily heat-treated metal rather than from expensive high-alloy rolled stock.

Figure 2:
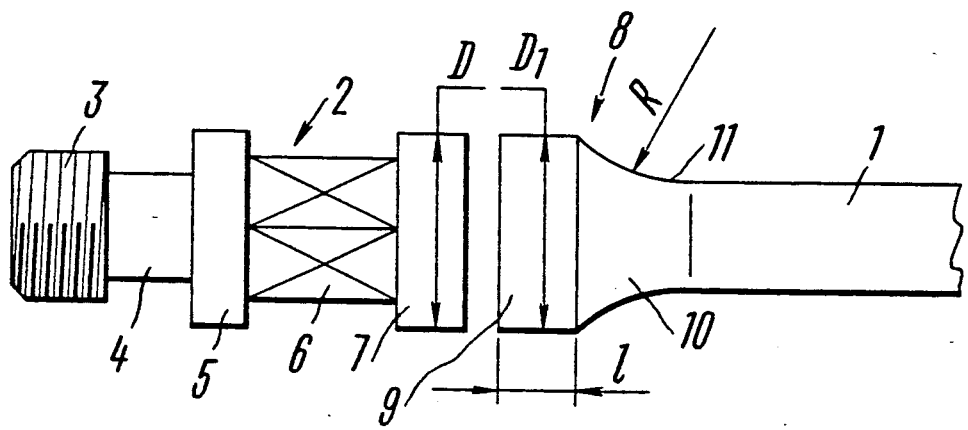
FIG. 2 is a general view of the same as in FIG. 1, shown after upsetting the rod body end portion, according to the invention.

The upsetting procedure results in forming a thickening 9 (FIG. 2) and a transition portion 10 on each of the end portions 8 of the rod body 1. The width of the thickened portion 9 in a direction square with the axis of the rod body 1 (a diameter $D_1$ in the embodiment illustrated herein) is equal to or in excess of the diameter D of the head 2 in the weld joint place, while its length 1 exceeds the width of the heat-affected area involved in welding.

The length 1 of the thickened portion 9 is selected on the ground of experimental findings on welding of specific materials and dimensions of the heads 2 and rod body 1 being welded together, proceeding from a prerequisite that the heat-affected area be within the length 1 of the thickened portion 9. Thus, for example, when friction welding is resorted to which is the most reasonable welding technique for making sucker rods, the shortening length of each item being welded is within 3 to 5 mm or about 0.1 D, with the diameter D of the rod heads 2 ranging within 31 and 62 mm. In this case the width of the heat-affected area in the head 2 and the rod body 1 involved in welding, ranges between 4 and 8 mm or about 0.12 to 0.15 D.

Thus, the length 1 of the thickened portion 9 must be in excess of the sum of shortening length in welding and the width of the heat-affected area, that is, in excess of 0.25 D. That is why the length 1 of the thickened portion 9 is most expedient to lie within 0.3 and 0.4 D. The width of the welded-on collar 7 of the end head 2 is accepted to be nearly equal to the length 1 of the thickened portion 9, though it may be other so as to suit the welding technique applied.

The transition portion 10 is shaped as a solid of revolution having a curvilinear generant 11 whose cross-section decreases smoothly and continuously from the thickened portion 9 towards the rod body 1. Besides, the generant 11 of the solid of revolution, according to the version, is circular arc having a radius R and tangent to the generant of the rod body 1, the center of said arc being situated outside of the sucker rod. The generant 11 may also be made as a combination of the circular arc with a line segment inclined with respect to the axis of the generant of the rod body 1.

The aforedescribed forms of the transition portion 10 are selected in accordance with Standard APJ Spec 11B and ensure operating reliability of sucker rods and a possibility of applying commonly used standard elevators.

The form of the transition portion 10 may be other than the one described above. However, it must be in fact a long-sweep curve, provide for the minimum stress concentration in the transition zone and prevent any damage to the sucker-rod and elevator surfaces during round-trip operations in the oil wells.

Figure 3:
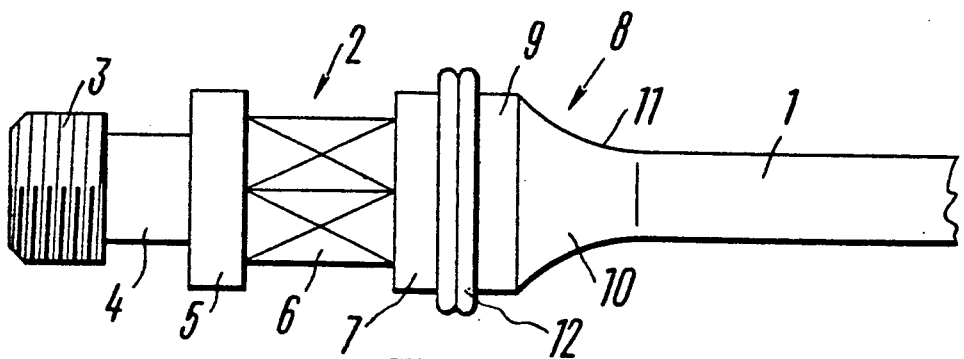
FIG. 3 is a general view of the same as in FIG. 2, showing the rod body welded to the end head, according to the invention.

Once the end portions 8 of the rod body 1 have been upset, the rod body 1 is welded together with the heads 2 by the friction welding technique, with resultant flash 12 (FIG. 3). It is of paramount importance in this case that the weld joint is established at the butt ends of the heads 2 and the rod body 1 having the maximum areas equal to $$\frac{\pi D^2}{4} \text{ and } \frac{\pi D_1^2}{4},$$

respectively on the rod section where the effective stress has the minimum value. It is in the aforesaid way that high reliability of the sucker rod weld joint is attained, since its area exceeds to a great extent $$\frac{\pi d^2}{4}$$

area of the rod body.

Figure 4:
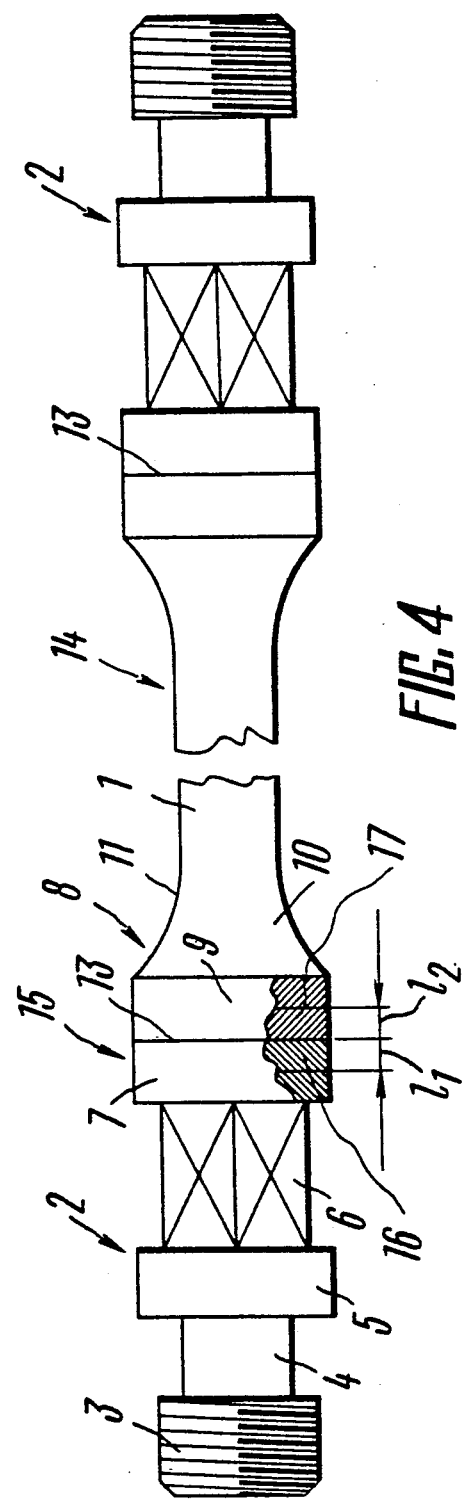
FIG. 4 is a general, fragmentarily cutaway and broken view of a finished sucker rod, according to the invention.

A completing operation of the method for making sucker rods of the invention is the turning of the weld joint zone, incorporating elimination of the flash 12 and machining the surfaces of the head 2 and the thickened portion 9 of the rod body 1 adjacent to a weld joint 13 (FIG. 4).

As a result, a finished item, that is, a sucker rod 14 is obtained, having in the weld-joint zone a turned cylinder-shaped portion 15 free from shoulders, undercut spots, or any other possible flaws. The drawing represents conventionally depicted heat-affected areas 16 and 17 involved in welding having respective widths $l_1$ and $l_2$ and located each on either side of the weld joint 13. To provide reliability of the weld joint the borderlines of the zones 16 and 17 must be within the limits of the cylinder-shaped portion 15.

The herein-proposed method is instrumental not only in making the sucker rods 14 having two external threads at the end heads 2 but also the sucker rods 14, wherein one of the end heads 2 has an internal thread.

Thus, the sucker rods made according to the proposed method meet the requirements imposed by Standard APJ Spec 11B, are featured by operating reliability and a possibility of using prehardened rolled stock for their manufacture, require no large capital investments for their production and make it possible to reduce their production cost.

The present invention can be used in manufacturing equipment for oil production.

What is claimed is:

1. A method for making sucker rods composed of a rod body (1) and end heads (2), comprising the steps of friction-welding of said rod body together with said end heads resulting in forming of heat-affected areas (16, 17); machine turning of the resultant weld joint zone, the friction-welding procedure being proceeded by upsetting the rod body end portions (8) at a temperature that precludes softening of the rod body (1) metal, with the result that a thickening (9) is formed on each of the end portions (8), the width of said thickening in a direction perpendicular with the rod body axis being equal to or in excess of the maximum diameter of the head (2) in the weld joint zone, while the length of said thickening exceeds the width of the heat-affected area (17) involved in the welding process, and a transition portion (10) being formed during said upsetting step shaped as a solid of revolution, whose cross-section smoothly and continuously decreases from the thickening (9) towards the axis of the rod body (1).

2. A method for making sucker rods as claimed in claim 1, wherein the generant (11) of the solid of revolution is a circular arc.

3. A method for making sucker rods as claimed 1 characterized in that the length of the thickening (9) on each of the rod body end portions (8) is selected to be 0.3 to 0.4 of the maximum diameter of the head (2).

4. A method for making sucker rods as claimed 2 characterized in that the length of the thickening (9) on each of the rod body end portions (8) is selected to be 0.3 to 0.4 of the maximum diameter of the head (2).

* * * * *